United States Patent [19]
Brodwin

[11] 3,783,448
[45] Jan. 1, 1974

[54] APPARATUS FOR MEASURING ELECTROMAGNETIC RADIATION

[76] Inventor: Morris E. Brodwin, 145 Laurel Ave., Highland Park, Ill. 60035

[22] Filed: July 30, 1971

[21] Appl. No.: 167,734

[52] U.S. Cl.... 343/100 ME, 73/355 R, 250/83.3 R, 324/95, 325/363, 343/703
[51] Int. Cl............................................ G01w 1/00
[58] Field of Search................ 343/110 ME, 760, 343/895, 703; 250/83.3 R; 325/363, 62, 364, 367; 340/227 R; 73/355 R; 328/128; 324/95

[56] References Cited
UNITED STATES PATENTS

| | | | |
|---|---|---|---|
| 3,129,330 | 4/1969 | Seling | 343/100 ME |
| 3,130,368 | 4/1964 | Hoover | 343/895 X |
| 3,063,010 | 11/1962 | Richardson | 325/363 X |
| 3,182,262 | 4/1965 | Schumann | 343/895 X |
| 3,230,532 | 1/1966 | Whitney | 343/100 ME |
| 3,631,346 | 12/1971 | Riggs | 325/363 |
| 3,167,714 | 1/1965 | Seling | 73/355 R X |
| 3,147,439 | 9/1964 | Eakin | 325/364 |
| 2,839,678 | 6/1958 | DeWitz | 325/364 |
| 3,641,439 | 2/1972 | Aslan | 324/95 |
| 2,692,334 | 10/1954 | Blumlein | 328/128 |
| 3,109,988 | 11/1963 | Hoover | 325/367 X |
| 3,639,841 | 2/1972 | Richardson | 325/364 X |
| 3,691,459 | 9/1972 | Anderson | 343/703 X |

*Primary Examiner*—Samuel Feinberg
*Assistant Examiner*—Richard E. Berger
*Attorney*—Irving Faber

[57] ABSTRACT

This invention relates to a new apparatus for measuring total electromagnetic radiation or exposure to non-ionizing electromagnetic radiation. The apparatus comprises, in combination, an equiangular spiral antenna, a crystal diode detector, a processor and an integrator. The apparatus, by means of the integrator totals the amount of electromagnetic radiation which it is exposed to.

12 Claims, 13 Drawing Figures

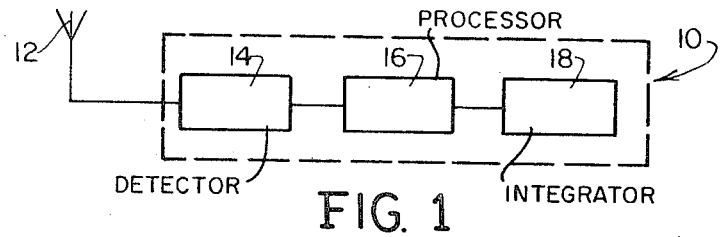
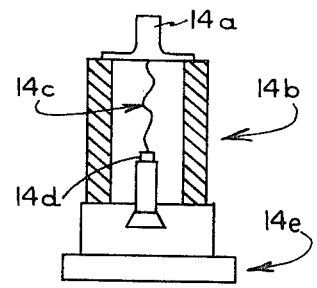
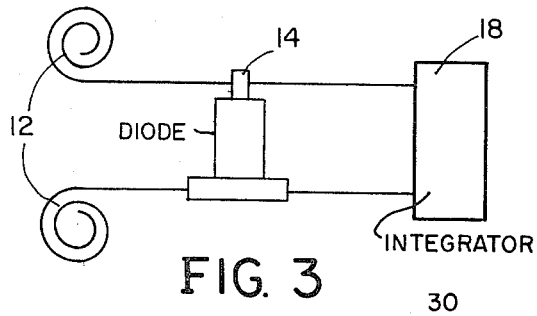
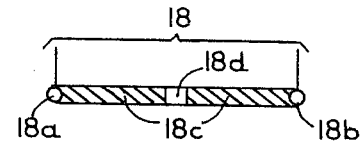
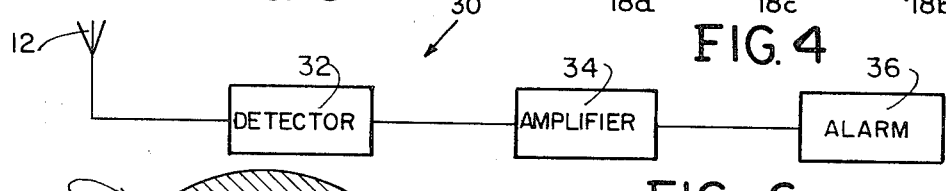
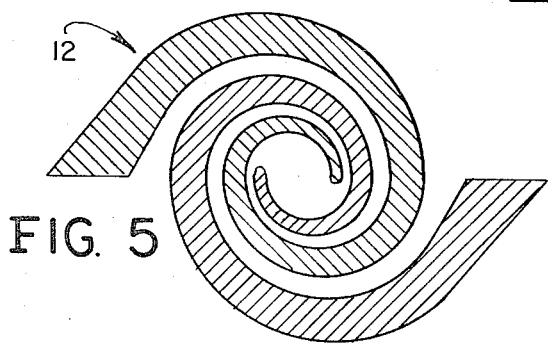
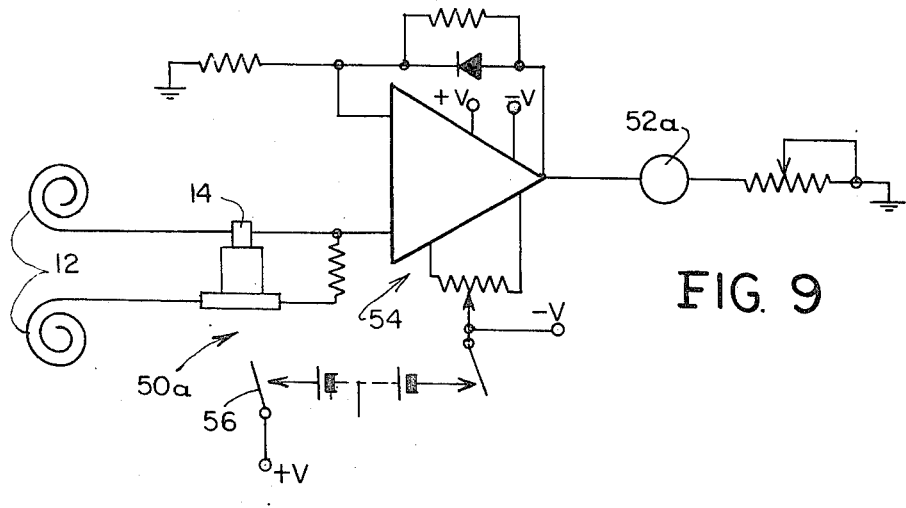

Inventor
MORRIS E. BRODWIN
BY
Irving Faber
ATTY.

APPARATUS FOR MEASURING ELECTROMAGNETIC RADIATION

BACKGROUND OF INVENTION

This invention relates to a new apparatus for measuring electromagnetic radiation and in particular for measuring the total dosage or exposure to non-ionizing electromagnetic radiation.

Microwave ovens are fast becoming the new servant of the home. Its ability to cut the cooking time of everyday foods from hours to minutes has saved the preparer of foods hours of time. However, there is presently a rising concern as to the possible hazardous effects of electromagnetic fields upon human subjects. Electromagnetic effects upon humans has been a concern for some time in the area of radar. It is known that overexposure to the electromagnetic waves does have an adverse effect upon humans, and if there is exposure to a large quantity of electromagnetic radiation, it can be deadly. Recently, the Department of Health, Education and Welfare has passed a regulation which limits the maximum radiation from commercial microwave ovens to 1 milliwatt per square centimeter at a distance of 5 centimeters; said radiation being measured from the external oven surface.

In September, 1969 the Medical College of Virginia, Virginia Commonwealth University at Richmond, Virginia held a Symposium entitled "Biological Effects and Health Implications of Microwave Radiation."

There is also growing concern about the effects of non-ionizing electromagnetic radiation from industrial processing, microwave communication links, and radars.

To the best knowledge of the inventor there presently is no commercial instrument for monitoring or measuring the total electromagnetic dosage of non-ionizing electromagnetic radiation.

Presently, there are instruments for monitoring electromagnetic fields which yield a reading of the electromagnetic field intensity at some instant in time. The National Bureau of Standards recently developed an instrument for monitoring electromagnetic field intensity; said instrument being described in the Electronic Development News of Nov. 1, 1970. This instrument displays a reading corresponding to the field intensity at a probe in the region of the radiating source. This instrument does not incorporate any integrating or total dosage features.

The Narda Microwave Corporation of Plainview, New York, manufactures an instrument for measuring the power density in the region of a probe; however, it doe not indicate the total dosage of radiation to which a person may be exposed.

The present invention is an innovation in the art of measuring non-ionizing electromagnetic radiation: The inventive apparatus measures the total electromagnetic dosage which a person or an area is exposed to.

SUMMARY OF INVENTION

The present invention for measuring total electromagnetic radiation incorporates in combination an antenna, a detector, a processor and an integrator.

One embodiment incorporates a total dosage apparatus which may be clipped on any portion of the individuals clothing and at the end of a predetermined period the apparatus is sent for examination or can be read visually, or by means of a suitable instrument.

Another embodiment of the invention is a personnel hazard meter which incorporates an alarm which is activated when the radiation exceeds a pre-set threshold.

A further embodiment of the invention is incorporated into an electromagnetic environment monitor which registers the radiation on a pre-calibrated meter which provides a direct reading of ambient power density.

The principal object of this invention is to provide an apparatus which will measure the total dosage of elctromagnetic radiation to which a person or an area is exposed.

A further object is to provide an electromagnetic radiation apparatus that will initiate an alarm when the radiation exceeds a certain pre-set level.

IN THE DRAWINGS

FIG. 1 illustrates, in block diagram, an apparatus for measuring the total dosage of electromagnetic radiation.

FIG. 2 illustrates a schematic of the crystal diode.

FIG. 3 illustrates the circuit for the dosimeter without the processor.

FIG. 4 is a schematic diagram of the totalizer.

FIG. 5 is a schematic of the antenna.

FIG. 6 illustrates, in block diagram the Personnel Hazard Warning Meter.

FIG. 9 is a schematic of the Electromagnetic Enviroment Monitor having a battery powered amplifier.

DESCRIPTION OF PREFERRED EMBODIMENT

Figure 7A:
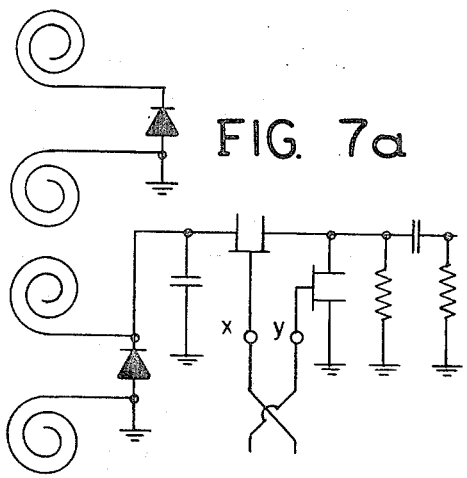
FIG. 7a is a schematic of the detection circuit for the Personnel Hazard Warning Device.

FIG. 1 illustrates, in block diagram form the basic elements of an apparatus for Measuring the Total Dosage of Electromangetid Radiation, the Dosimeter, 10, which comprises, in combination, an antenna, 12, coupled to a crystal diode detector, 14. The detector, 14, is coupled to a processor, 16, which is coupled to an integrator, 18. The coupling of the antenna to the detector; the detector to the processor; and, the processor to the integrator are by means well known in the art.

The antenna, 12, which will be described in greater detail hereinafter, directs ambient electromagnetic fields to the crystal diode detector, 14, which rectifies the high frequency electromagnetic currents into a direct current. The direct current is a measure of the intensity of the electromagnetic field in which the antenna, 12, is placed.

The processor, 16, is of a type commonly known in the art which has the function of amplifying the signal from the detector, 14. The amplified signal from the processor, 16, is coupled directly to the integrator, 18. It is understood that the primary function of the processor, 16, is to increase the sensitivity of the dosimeter, 10, and could be deleted from the circuitry without materially affecting the reliablity of the dosimeter, 10; said circuit being illustrated in FIG. 3. The integrator, 18, is a totalling device well known in the art and totals the amount of radiation to which the antenna is exposed.

A typical type of totalizer, 18, suitable for use with the dosimeter, 10, is illustrated in FIG. 4; said totalizer being manufactured by Curtis Instrument, Inc., model 150-SP2.

The totalizer illustrated in FIG. 4 is comprised of an anode 18a and cathode 18b; a column of mercury 18c is disposed between the anode and cathode. An electrolytic gap 18d is positioned within the mercury column 18c breaking said column.

The rectified current from the crystal diode 14 is applied across the anode and cathode terminals 18a and 18b of the integrator 18. The rectified current causes the mercury ions to migrate across the electrolytic gap 18d displacing the gap toward the anode. The movement of the gap is directly proportional to the total charge passing from the diode 14. To reset the integrator, current is passed in the opposite direction. An appropriate scale is placed on the integrator to enable one to read the total dosage of electromagnetic radiation which the antenna 12 is exposed to.

The detector, 14, is a common diode detector which converts the oscillating signal into a related direct current and can be readily obtained in the general market. A common detector construction is illustrated schematically in FIG. 2. The diode detector 14 is comprised basically of a pin end 14a, a ceramic tube 14b, a tungsten whisker 14c, a silicon block 14d, and a head 14e.

The antenna, 12, as best illustrated in FIG. 5 is an equiangular spiral antenna having the following design characteristics; a large frequency bandwidth; a broad antenna pattern; and a constant radiation resistance.

The antenna, 12, as illustrated in FIG. 5, is an example of the class of antennas suitable for use with these instruments. These antennas have the following desirable characteristics. They are insensitive to the orientation of the electric field. This characteristic is commonly described by stating that the antenna responds to circular polarization. The antenna pattern and the radiation resistance remain relatively constant over frequency ratios of 5:1 or greater. All antennas of this class are distinguished by a number of distinctive features. The center region contains points to which the apparatus is connected. Elements appear to grow out of the center region according to different criteria. In the specific example, the criterion for the elements is based upon the mathematical description of an equiangular spiral. Other antennas of the same class are described as: Circular or rectangular spirals, spiraling circular arcs, logarithmic spirals, and certain zig-zag structures called logarithmic antennas. Any member of this class of antennas can be used with the apparatus described above. The complementary structures, or equivalent slot antennas are encompassed by the same description.

Existing devices, used for monitoring non-ionizing electromagnetic radiation, employ dipole antennas. These structures are distinguished by resonant elements and thus cannot cover the same frequency ratios with corresponding constancy of impedance. Furthermore, the basic antenna cannot respond to electric fields of certain orientations. They are called linearly polarized antennas. Combinations of dipole antennas can be made insensitive to polarization.

A second embodiment of the invention is a Personnel Hazard Warning Meter, 30, which is illustrated in block diagram in FIG. 6, and is used to activate an alarm when it is placed in a dangerous electromagnetic environment.

The warning meter 30 is comprised of three sections, a detecting section 32, an amplifier-threshold section 34 and an alarm section 36.

The detecting section 32 is schematically illustrated in FIG. 7a and comprises the antenna and crystal diode as hereinabove described.

Figure 7B:
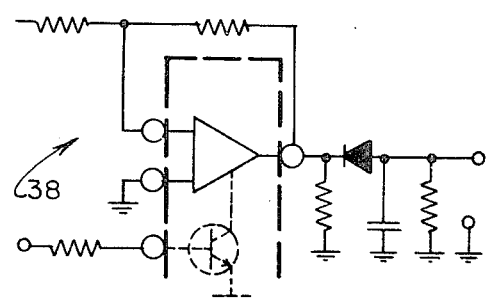
FIG. 7b is a schematic of an integrated circuit amplifier.
Figure 7D:
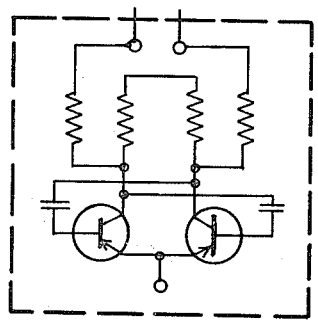
FIG. 7d is a schematic of a drive circuit for the chopper input of the integrated circuit amplifier.
Figure 7C:
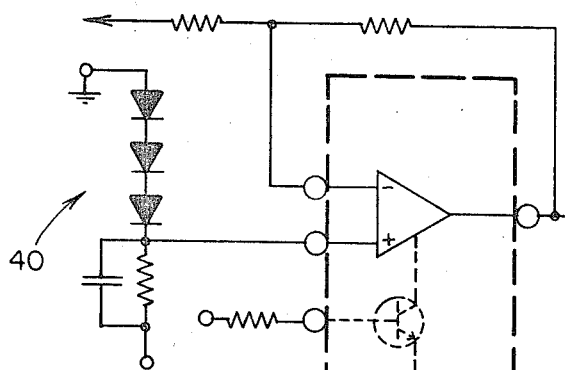
FIG. 7c is a schematic of the threshold circuit.

The amplifier-threshold section is composed of two circuits; an integrated circuit amplifier 38, the circuit thereof being illustrated in FIG. 7b, and a threshold circuit 40 which is illustrated in FIG. 7c. The output of the integrated circuit amplifier and the input to the threshold circuit 40 are coupled together by means well known in the art. The threshold circuit incorporates therein a totalizing or integrating circuit so that different criteria for Maximum Permissible Exposure (MPE) can be chosen thereby enabling the instrument 30 to operate at any designated value.

The circuits 38 and 40 illustrated in FIGS. 7b and 7c respectively are known in the art and the values for the parameters illustrated therein were designed to give optimum results while enabling the warning instrument 30 to be set or calibrated for any value of Maximum Permissible Exposure set by the authorities.

A drive circuit for the chopper input of the integrated circuit amplifier is illustrated in FIG. 7d and is coupled to the amplifier across terminals x and y.

Figure 7E:
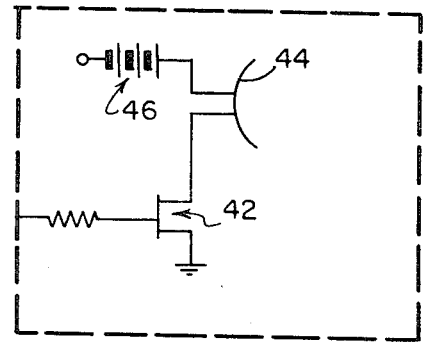
FIG. 7e is a schematic of the alarm section of the Personnel Hazard Warning Device.

The alarm section 36 is coupled to the output of the amplifier-threshold section 34; the circuit for said alarm circuit being illustrated in FIG. 7e. The d.c. output of the threshold circuit controls a FET (Field Effect Transistor) 42 which is used as a switch, or a gate, to turn on the alarm device 44. The alarm illustrated in FIG. 7e is a "SONALERT" device, well known in the art, which produces a piercing sound by means of an oscillator and piezoelectric transducer, not shown. However, there are several devices which can be used, audio, visual or a combination thereof to enable a person to be put on notice that he is in immanent danger. A battery, 46, is coupled to the alarm circuit; power being transmitted through the alarm device when the gate is closed.

Different modes of operation are possible. For example, long term exposure of 10 mw/cm$^2$ is presently considered to be the maximum permissible exposure. With larger power densities, a total dosage of 1.0 mw-hr/cm$^2$ is permissible for each 6 minute period. An integration time of 6 minutes can be set into the amplifier circuits to trigger the alarm when the total energy exceeds this level.

The device is designed for long term operation, 1 year without battery replacement. The alarm circuit can be arranged either to be of the lock-up type or the instantaneous type. In the former mode of operation, whenever the MPE is exceeded, the alarm continues to sound until manually shut off. In the latter mode, as soon as the signal is below the pre-set threshold, the alarm is turned off.

A number of fail-safe features are utilized. If the battery voltage falls below an effective value, the alarm automatically sounds. External test points are provided for monitoring the battery. A push button battery test check is also provided so that the battery can be checked if it is suspected that it has failed. Test points are provided so that an external signal can be impressed at the input terminals to check the system. If the crystal should fail in the open circuit or short circuit condition, the alarm will automatically operate.

Figure 8:
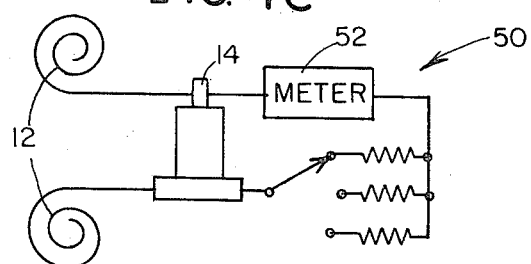
FIG. 8 is a shematic of the Electromagnetic Environment Monitor.

Another embodiment of the invention an Electromagnetic Environment Monitor, 50, is illustrated in FIG. 8 and is used for a wide frequency range electromagnetic monitor.

The Electromagnetic Environment Monitor or Intensity Meter, 50, incorporates the flat spiral antenna, 12, and crystal detector, 14, of the Dosimeter, 10. FIG. 8 illustrates one mode of operation of the monitor, 50, wherein the output signal from the crystal detector, 14, is coupled, by means well known in the art, to an edgewise meter movement 52 or similar meter which is directly calibrated to a maximum of 10 mw/cm². The face calibration of the instrument follows the linear-to-square law characteristic of the crystal diode in order to provide a direct reading indication of ambient power. Adjustable resistors, not shown, are provided to set the maximum point at a particular frequency and the instrument can be calibrated over its entire frequency range. Meter protection, well known in the art, not shown, is provided in case of power levels exceeding the maximum indicated value.

To obtain a larger measurable power range, for the Monitor, 50, the circuit illustrated in FIG. 9, is used and the Monitor designated by the reference 50a. As illustrated in FIG. 9, the crystal diode, 14, is connected to a battery powered amplifier, 54, operating in an approximate logarithmic response. Here two ranges are provided, a 0.1 to 10.0 milliwatt range, and a .01 to 1 milliwatt range. The ranges are selected by means of an external range switch 56 which has multiple functions. This spring-loaded switch is normally in the off position. The first position provides an automatic battery check. The second position operates the least sensitive range first in order to prevent burn-out of the meter movement. The final position represents the most sensitive range. An internal test circuit is provided to determine whether the instrument is functioning properly. With this instrument a wide power range monitoring function can be carried out. This instrument, utilizing the same broad band antenna and crystal as the previous one, provides a versatile means of determining the electromagnetic environment.

It is believed that the invention has been described in such detail as to enable those skilled in the art to understand the same, and it will be appreciated that variations or modifications may be made without departing from the spirit and scope of the invention.

I claim:

1. An apparatus for measuring the total electromagnetic radiation and exposure to non-ionizing electromagnetic radiation, comprising in combination:
   a polarization insensitive antenna;
   a crystal diode; and
   an integrator having an anode, a cathode, and an electrolytic gap between the anode and cathode; the output of the crystal diode being applied across the anode and cathode causing electrolytic ions to migrate across the electrolytic gap toward the anode proportional to the charge passing from the diode for totaling the amount of radiation to which the antenna is exposed over the entire time the source of radiation is observed;
   wherein the antenna is directly coupled to the crystal diode detector and the crystal diode detector is directly coupled to the integrator; the antenna directing the ambient high frequency electromagnetic current of its environment to the crystal diode where said electromagnetic radiation is rectified.

2. An apparatus for measuring electromagnetic radiation as defined in claim 1 wherein said antenna further comprises a plurality of elements eminating from the center thereof.

3. An apparatus for measuring electromagnetic radiation as defined in claim 1 further comprising in combination therewith:
   a processor, said processor being positioned between the crystal diode and the totalling device and respectively coupled thereto, wherein said processor amplifies the signal from said crystal diode detector.

4. An apparatus for measuring the total electromagnetic radiation and exposure to non-ionizing electromagnetic radiation, comprising in combination:
   an equiangular spiral antenna, said antenna being responsive to circular polarization;
   a crystal diode detector;
   a processor coupled to said detector for amplifying a signal from the crystal diode detector; and
   an integrator, said integrator being coupled to the processor for totaling the amount of radiation to which the antenna is exposed, said antenna being directly coupled to the crystal diode;
   wherein the integrator has an anode, a cathode, and an electrolytic gap between the anode and cathode; the output from the crystal diode being applied across the anode and cathode causing electrolytic ions to migrate across the electrolytic gap toward the anode proportional to the charge passing from the diode.

5. An apparatus as defined in claim 4 for measuring the total electromagnetic radiation and exposure to non-ionizing electromagnetic radiation wherein said antenna further comprises:
   a plurality of elements eminating from the center thereof and forming one of a plurality of geometric spirals; the antenna pattern and the radiation resistance of said antenna remaining relatively constant over frequency ratios of 5:1 and greater.

6. An apparatus for measuring the total electromagnetic radiation and exposure to non-ionizing electromagnetic radiation, comprising in combination:
   an equiangular spiral antenna, said antenna being responsive to circular polarization;
   a crystal diode detector coupled to said antenna, said detector converting the oscillating signal of the electromagnetic radiation into a related direct current;
   an amplifier-threshold device, the input of the amplifier-threshold device being coupled to the output of the detector;
   an integrator having an anode, a cathode, and an electrolytic gap between the anode and cathode; the rectified current from the output of the amplifier being applied across the anode and cathode causing electrolytic ions to migrate across the electrolytic gap toward the anode proportional to the charge passing from the diode for totaling the amount of radiation to which the antenna is exposed over the entire time the source of radiation is observed; and an alarm apparatus, said alarm apparatus being coupled to the output of the integrator.

7. An apparatus for measuring the total electromagnetic radiation as defined in claim 6 wherein said amplifier-threshold device comprises:
   an integrated circuit amplifier, and
   a threshold circuit;
   said integrated circuit amplifier and the threshold circuit being coupled together and wherein said threshold circuit directly totals the amount of radiation which the antenna is exposed to.

8. An apparatus as defined in claim 7 for measuring the total electromagnetic radiation, said antenna further comprising:
   a plurality of elements eminating from the center thereof and forming one of a plurlaity of geometric spirals; the antenna pattern and the radiation resistance of said antenna remaining relatively constant over frequency ratios of 5:1 and greater.

9. An apparatus as defined in claim 7 for measuring the total electromagnetic radiation wherein said alarm apparatus comprises:
   a horn, said horn being activated upon a preset output of the threshold circuit.

10. An apparatus for measuring the total electromagnetic radiation and exposure to non-ionizing electromagnetic radiation, comprising in combination:
    an equiangular spiral antenna, said antenna being responsive to circular polarization;
    a crystal diode detector coupled to said antenna; said detector converting the oscillating signal of the electromagnetic radiation into a related direct current;
    an integrator having an anode, a cathode, and an electrolytic gap between the anode and cathode; the rectified current from the crystal diode being applied across the anode and cathode causing electrolytic ions to migrate across the electrolytic gap toward the anode proportional to the charge passing from the diode; and
    an edgewise meter movement coupled to the output of said integrator, said meter movement being calibrated in milliwatts per square centimeter.

11. An apparatus for measuring the total electromagnetic radiation as defined in claim 10 wherein said antenna further comprises:
    a plurality of elements eminating from the center thereof and forming one of a plurality of geometric spirals; the antenna pattern and the radiation resistance of said antenna remaining relatively constant over frequency ratios of 5:1 and greater.

12. An apparatus as defined in claim 11 for measuring the total electromagnetic radiation wherein said edgewise meter movement includes a range selector to enable said meter to incorporate a broad power range.

* * * * *